United States Patent
Wild et al.

(10) Patent No.: US 10,989,213 B2
(45) Date of Patent: Apr. 27, 2021

(54) SHAFT BEARING DEVICE WITH A LIFTING DEVICE

(71) Applicant: Sulzer Management AG, Winterthur (CH)

(72) Inventors: Andreas Wild, Bruchsal (DE); Nicolas Lagas, Portland, OR (US)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 16/048,927

(22) Filed: Jul. 30, 2018

(65) Prior Publication Data

US 2019/0063449 A1 Feb. 28, 2019

(30) Foreign Application Priority Data

Aug. 23, 2017 (EP) .................................. 17187563.6

(51) Int. Cl.
*F04D 29/041* (2006.01)
*F16C 25/06* (2006.01)
(Continued)

(52) U.S. Cl.
CPC .......... *F04D 29/041* (2013.01); *F04D 29/042* (2013.01); *F04D 29/049* (2013.01); *F04D 29/0413* (2013.01); *F04D 29/146* (2013.01); *F16C 25/06* (2013.01); *F04D 29/02* (2013.01); *F04D 29/06* (2013.01); *F16C 2360/44* (2013.01)

(58) Field of Classification Search
CPC .... F16C 25/06; F16C 25/083; F16C 2360/44; F04D 29/041; F04D 29/0413; F04D 29/042; F04D 29/046; F04D 29/049; F04D 29/146
See application file for complete search history.

(56) References Cited

U.S. PATENT DOCUMENTS 3,468,259 A * 9/1969 Morzynski .......... F04D 29/0416
277/358
5,719,454 A * 2/1998 Halsey .................. F16C 25/083
384/517
(Continued)

FOREIGN PATENT DOCUMENTS

DE 886250 C 8/1953
DE 3104909 U1 7/1981
(Continued)

OTHER PUBLICATIONS

Extended European Search Report dated Feb. 27, 2018 in corresponding European Application No. 17187563.6, filed Aug. 23, 2017.

*Primary Examiner* — James Pilkington
(74) *Attorney, Agent, or Firm* — Global IP Counselors, LLP

(57) ABSTRACT

A shaft bearing device for a pump includes an antifriction bearing, which can be connected to an axially displaceable pump shaft. A spring is arranged at the antifriction bearing in such a way, that a spring force can be transmitted to an outer ring of the antifriction bearing by the spring in a mounting condition of the shaft bearing device. A lifting element attached to the pump shaft and a corresponding counter element are separated from each other by the spring force in a starting state and/or in a shutdown state of the pump.

14 Claims, 6 Drawing Sheets

(51) Int. Cl.
*F04D 29/042* (2006.01)
*F04D 29/049* (2006.01)
*F04D 29/14* (2006.01)
F04D 29/02 (2006.01)
F04D 29/06 (2006.01)

(56) References Cited

U.S. PATENT DOCUMENTS

| | | | | |
|---|---|---|---|---|
| 5,887,985 | A | * | 3/1999 | Loree, II ................. A61L 27/30 384/492 |
| 5,899,574 | A | * | 5/1999 | Chujo ................... F16C 25/083 384/518 |
| 7,237,962 | B2 | * | 7/2007 | Zernikow ............... F16C 19/54 384/518 |
| 7,465,101 | B2 | * | 12/2008 | Hoefs ................... F16C 25/083 384/517 |
| 8,119,577 | B2 | * | 2/2012 | Stecher .................... B05D 5/08 427/385.5 |
| 8,242,649 | B2 | * | 8/2012 | Fradella ................. H02K 7/025 310/74 |
| 9,702,403 | B2 | * | 7/2017 | Beck ..................... F16C 35/077 |
| 2017/0167483 | A1 | * | 6/2017 | Kool ....................... F04B 53/14 |

FOREIGN PATENT DOCUMENTS

| | | |
|---|---|---|
| EP | 0355796 A1 | 2/1990 |
| EP | 0694696 A1 | 1/1996 |
| WO | 2015074903 A1 | 5/2015 |

* cited by examiner

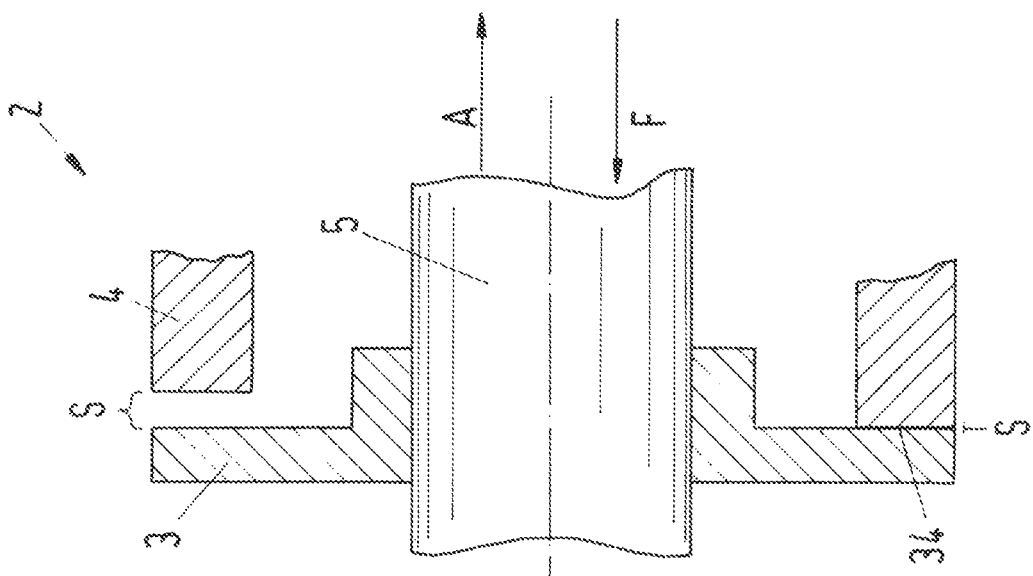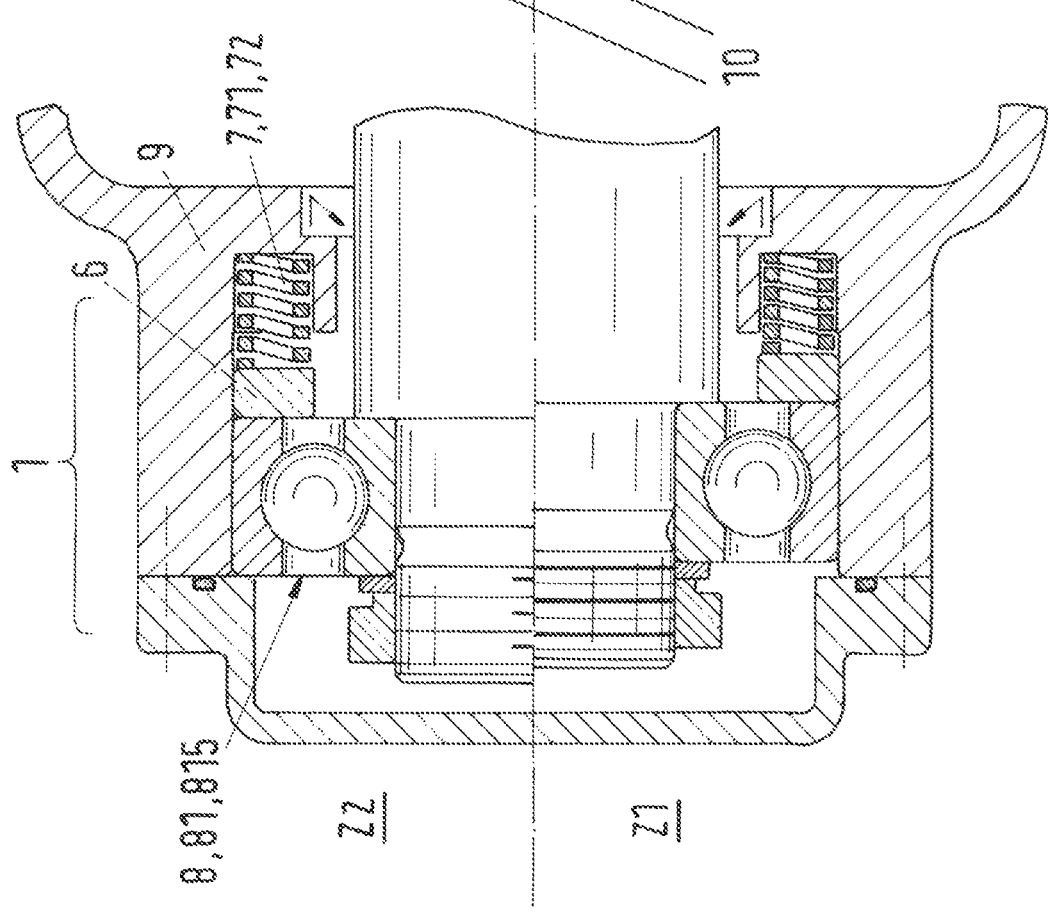
Fig.6

SHAFT BEARING DEVICE WITH A LIFTING DEVICE

CROSS-REFERENCE TO RELATED APPLICATION

This application claims priority to European Application No. 17187563.6, filed Aug. 23, 2017, the contents of which are hereby incorporated herein by reference.

BACKGROUND

Field of the Invention

The invention relates to a shaft bearing device with an integrated lifting device. The invention further relates to a pump with a shaft bearing device. The invention further relates to a bearing connectable to a pump shaft.

Background of the Invention

Bearings are used wherever forces acting in certain directions have to be compensated or movements of an object in unwanted directions have to be prevented. Two main types of bearings are used in pumps, radial bearings and axial bearings.

When operating centrifugal pumps, an axial thrust is generated which acts in the direction of the suction side. To release this thrust, a relief disk is installed on the pressure side of the shaft whose function depends on the pump pressure. If the conveying liquid does not have the required pressure, e.g. when starting or shutting down the pump, there may be contact with the relief disk and the counter disk. This causes wear, eventually resulting in the failure of the system. Lifting devices are used to bridge the critical phases during starting and shutting down. Since the relief disks are on top of each other when the pump unit is at a standstill, contact occurs at low rotational speeds, e.g. when starting or shutting down the pump unit, and thus, resulting in signs of wear. The reason for this is that no hydraulically stable correlation of forces can be achieved at the relief disks and thus no relief gap can be formed. To ensure a contactless start or shutdown of the pump unit, a displacement of the pump shaft and thus a gap is created by lifting devices.

Centrifugal pumps with a lifting device are known from EP 0 694 696 B1. These create an axial thrust on an axially displaceable rotor shaft of a centrifugal pump. The device consists of a first body which can be connected to the rotor shaft and which has a permanent magnet and a second permanent magnet being fixedly arranged, wherein the two permanent magnets are assigned to each other in such a way that the acting magnetic forces retain the rotor shaft in a rest position or that they act in such a way on the rotor shaft in the event of a displacement from the rest position caused by the operation of the centrifugal pump, that they generate a force opposite to the direction of displacement. The disadvantage of this solution are the high costs associated with it, which are caused by the expensive permanent magnets.

A centrifugal pump with a lifting device and an electromagnetic bearing is known from EP 0 355 796 A2. Relief devices have been used for a long time to compensate for the axial thrust of a running centrifugal pump. A typical relief device of a centrifugal pump comprises a rotating relief disk and a fixed relief counter disk, which form a gap extending in the radial direction, through which gap a part of the pressurized fluid in the centrifugal pump flows to the outside. As a result, the shaft of the centrifugal pump is kept in an axial direction in a state of equilibrium between the force generated by the axial thrust and the counterforce generated by the relief device. Transition phases can occur during operation of the centrifugal pump, for example when starting or stopping, when the fluid may have a low pressure, so that the shaft cannot be kept in a state of equilibrium. In such a transition situation, there is a risk that the two disks of the relief device may touch each other, which could damage them. To avoid such damage, a force is exerted on the axial position of the shaft during the transition phase or during the standstill of the centrifugal pump by means of a controlled electromagnet in such a way, that the two disks of the relief device do not touch each other.

This well-known device has the disadvantage that the axial position of the shaft has to be detected by a sensor and controlled by means of controllable electromagnets. The well-known device has the further disadvantage, that the maximum possible displacement in the axial direction is very small.

A relief element is known from WO 2015/074903, which is torque-proofly coupled to the shaft. A throttle gap is formed with the counter element by arranging a device for spacing on the counter element to keep the relief element away from the counter element. The device for spacing has a force element, preferably a spring, which generates a force opposite to the axial thrust. This well-known device has the disadvantage, that the replacement of wear parts such as the force generating element is laborious.

SUMMARY

A major disadvantage of the lifting devices known from the state of the art is that the length of the pump is increased by certain devices and a separate housing is necessary or the device geometry is complex and expensive.

It is therefore an object of the invention to provide a shaft bearing device with a lifting device of simple structural design, which are suitable for simple and cost-effective production and which can be used simultaneously in an axial bearing arrangement for receiving high pressure loads, while avoiding the adverse effects and high costs known from the state of the art.

This object is met by a shaft bearing device with the features described herein for use in a pump and a bearing.

According to the invention, a shaft bearing device for a pump is proposed. In one embodiment, the shaft bearing device comprises an antifriction bearing, which can be connected to an axially displaceable pump shaft. A spring is arranged at the antifriction bearing in such a way, that a spring force can be transmitted to the antifriction bearing by the spring in a mounting condition of the shaft bearing device in such a way, that a lifting element attached to the pump shaft and a corresponding counter element are separated from each other in a starting state and/or in a shutdown state of the pump. In particular, the spring is arranged at the antifriction bearing in such a way that the spring force F acts parallel to the axis of the pump shaft. Thus, the spring is arranged at the antifriction bearing in such a way that a spring force F acts on the outer ring of the antifriction bearing, so that an axial thrust of the pump shaft can be compensated in a shutdown state and/or in a starting state. A lifting element attached to the pump shaft and a corresponding counter element are separated from each other in a starting state and/or in a shutdown state by the spring force of the spring. After the starting state, when the self-lubrication of the pump has started, a lubricant film forms between the lifting element and the counter element, so that the lifting element and the counter element can run on each other substantially without wear by a lubricating film of a lubricating fluid located between them. In practice, the pump may be a centrifugal pump, in particular a single-stage or a multi-stage centrifugal pump.

In practice, the shaft bearing device may be arranged on the drive side and/or on the non-drive side.

It is therefore essential for the invention that the antifriction bearing is arranged at the pump shaft in such a way, that an axial pressure can be exerted on the pump shaft via the spring, so that the lifting element and the counter element are separated from each other in the starting state by the axial pressure of the spring, in order prevent wear of the lifting element and the counter element due to lack of lubrication.

Particularly advantageously, the bearing housing of the antifriction bearing and/or a pressure ring arranged at the antifriction bearing can have a pressure surface on which the spring force can act.

In practice, the spring is arranged between the antifriction bearing and the housing, so that the spring force can act.

It is crucial that a lifting device is integrated in the shaft bearing device and thus preferably no additional housing is needed for a separate lifting device.

In practice, the lifting device is torque-proofly connected to the shaft, the counter element is connected to the pump housing stationary, i.e. immovable, so that a displacement of the lifting element against the counter element takes place by axial movement of the pump shaft.

It is significant for the invention that the shaft bearing device is a radial bearing.

In general, an axial thrust is referred to below as the effect of a force which acts in the axial direction on the pump shaft and which is caused by the rotation of the impellers of the pump. In general, a spring is referred to below as a spring, in particular a spiral spring, especially a disk spring, which exerts a spring force correlating with the spring constant. In general, a pressure ring is referred to below as a disk-shaped ring, especially a disk-shaped circular ring being arranged in the bearing housing of the antifriction, which is arranged around the pump shaft and which is usually made of a suitable metal or another suitable material, so that the axially acting spring forces can be transmitted to the outer ring of the antifriction bearing via the circumference of the pressure ring by means of the pressure ring. In general, a spring force is referred to below as a force, which is caused by a spring, in particular a spiral spring, especially a disk spring and which acts on the pump shaft against the axial thrust via the antifriction bearing, in particular via the pressure ring and the antifriction bearing. In general, a starting state is referred to below as the state of the pump, in which the pump is started and starts up, in particular the state in which no lubricant film is yet formed between the counter element and the lifting element, in particular the state in which the spring force is greater than the axial thrust to such an extent that the lifting element and the counter element are separated from each other. In general, a shutdown state is referred to below as the state of the pump, in which the pump is stopped and shuts down, in particular the state in which the lubricant film between the counter element and the lifting element decreases, in particular the state in which the spring force is greater than the axial thrust to such an extent that the lifting element and the counter element are separated from each other.

In general, a lubricating fluid is referred to below as a fluid with lubricating properties, in particular, a lubricating fluid can also be a lubricant. In practice, a lubricating fluid is directly the pumped product or, in special cases, a separate lubricating fluid. In general, an shaft bearing device is referred to below as a bearing, which can endure axial and radial forces.

The advantages of the pump according to the invention and the shaft bearing device or lifting device according to the invention are in particular:

constructively simple configured shaft bearing device with lifting device;

the shaft bearing device has a substantially smaller device geometry than pumps with additional lifting device and therefore, it does not increase the pump length;

it can be produced inexpensively; and it allows an easy replacement of wear parts;

In practice, it is possible that the shaft bearing device is a radial bearing.

In the embodiment of the invention, the shaft bearing device comprises an antifriction bearing with an inner ring and an outer ring.

In an embodiment of the invention that is particularly advantageous in practice, the spring is supported by a pressure ring at the outer ring of the antifriction bearing. Thus, as already mentioned, a pressure ring is arranged between the antifriction bearing and the spring at the bearing housing of the antifriction bearing, so that the spring force is transmitted via the pressure ring to the antifriction bearing and thus to the pump shaft. This arrangement is preferably used for spiral springs, while using disk springs, the force acts in particular directly on the outer ring.

In another specific embodiment of the invention, at least three springs are arranged over the circumference of the antifriction bearing and/or the pressure ring, in particular at the same distance. The springs may be arranged between the housing and the antifriction bearing and/or the pressure ring, in particular distributed over the circumference of the antifriction bearing and/or the pressure ring and arranged at the same distance from each other in a particularly advantageous way.

In another embodiment of the invention important for practice, the spring may be designed as a disk spring that wraps around the pump shaft.

In the embodiment of the invention, the antifriction bearing may be a ball bearing and/or a cylindrical roller bearing. The bearings may be open, semi-open or closed.

Depending on the type of bearing, a pressure ring is required to provide a pressure surface for the force transmission.

It is also possible, that the ball bearing is primarily a grooved ball bearing and/or an angular ball bearing.

In practice, the contact surface of the lifting element and/or of the counter element may be coated, in particular ceramic coated. Thus, the wear of the two elements can be minimized.

In this case, the lifting element and/or the counter element and/or the pressure ring and/or the antifriction bearing can comprise a fiber-reinforced compound material or a thermoplastic synthetic material, in particular a polyether ketone. The lifting element and/or the counter element and/or the pressure ring and/or the antifriction bearing can be made of one or more of these materials, especially also of a compound material. The antifriction bearing can also be made of ceramic. The pressure ring is preferably made of steel.

It is clear, that the contact surface of the lifting element and/or of the counter element can also be coated with a solid lubricant and/or with a ceramic. In doing so, the sliding properties are improved and the wear of both elements is minimized. A ceramic coating may be in particular silicon carbide.

According to the invention, a pump with a shaft bearing device according to the invention is further proposed. In this embodiment, the shaft bearing device comprises an axially displaceable pump shaft, an antifriction bearing and a spring. The antifriction bearing is preferably connected to the pump shaft and the spring is arranged at the antifriction bearing. In particular, the spring is arranged at the antifriction bearing in such a way that the spring force F acts parallel to the axis of the pump shaft. Thus, the spring is attached to the antifriction bearing in such a way that a spring force F acts on the outer ring of the antifriction bearing, so that an axial thrust of the pump shaft can be compensated in the shutdown state and/or in the starting state. A lifting element attached to the pump shaft and a corresponding counter element are separated from each other by the spring force of the spring in a shutdown state and/or in a starting state. After the starting state, when the self-lubrication of the pump has started, a film of lubricant forms between the lifting element and the counter element, so that the lifting element and the counter element can run on each other substantially without wear by means of a lubricating film of a lubricating fluid located between them. In practice, the pump may be a centrifugal pump, in particular a single-stage or a multi-stage centrifugal pump.

According to the invention, a bearing for a pump and a shaft bearing device is further proposed. In this embodiment, the bearing comprises an antifriction bearing, which can be connected to an axially displaceable pump shaft and a spring, which is arranged at the antifriction bearing in such a way, that a spring force can be transmitted to the antifriction bearing by the spring in a mounting condition of the bearing.

In the following the invention will be explained in more detail by means of embodiments with reference to the drawing.

BRIEF DESCRIPTION OF THE DRAWINGS

The invention will be explained in more detail hereinafter with reference to the drawings.

FIG. 6 is a longitudinal section of the shaft bearing device according to the invention in different operating states;

DETAILED DESCRIPTION OF THE EMBODIMENTS

Figure 1:
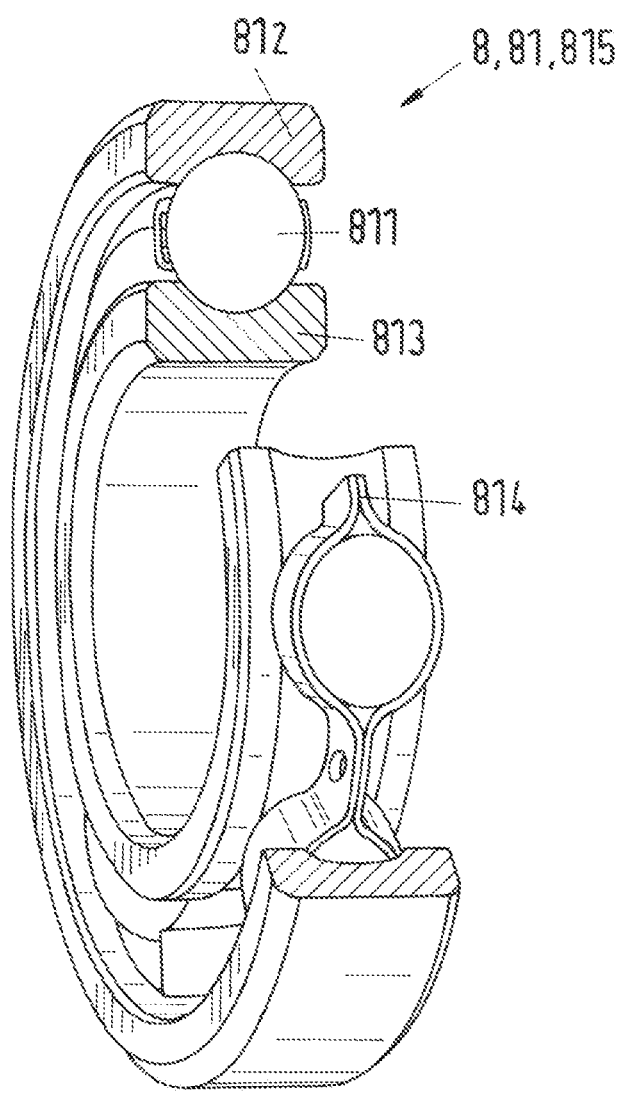
FIG. 1 is a schematic illustration of an antifriction bearing.

FIG. 1 shows a schematic illustration of an antifriction bearing 8, 81, 815. In this embodiment, the antifriction bearing 8 is designed as a ball bearing 81, in particular as a grooved ball bearing 815. The antifriction bearing 8, 81, 815 comprises an outer ring 812, an inner ring 813 and the balls 811 arranged in between with bearing cage 814. The inner ring 813 is torque-proofly connected to a pump shaft 5, so that, as shown by way of example in FIG. 2, the force F caused by a spring 7, 71, 72 of the lifting device acts on the outer ring 812. In the operating state, a displacement of the inner ring 813 and the torque-proofly coupled pump shaft 5 is caused by the force F acting on the outer ring 812. This fundamental mode of action between spring 7, 71, 72 and the antifriction bearing 8, 81, 815 is shown in FIG. 2, for example, whereby in FIG. 1 the representation of the spring has been omitted.

Figure 2:
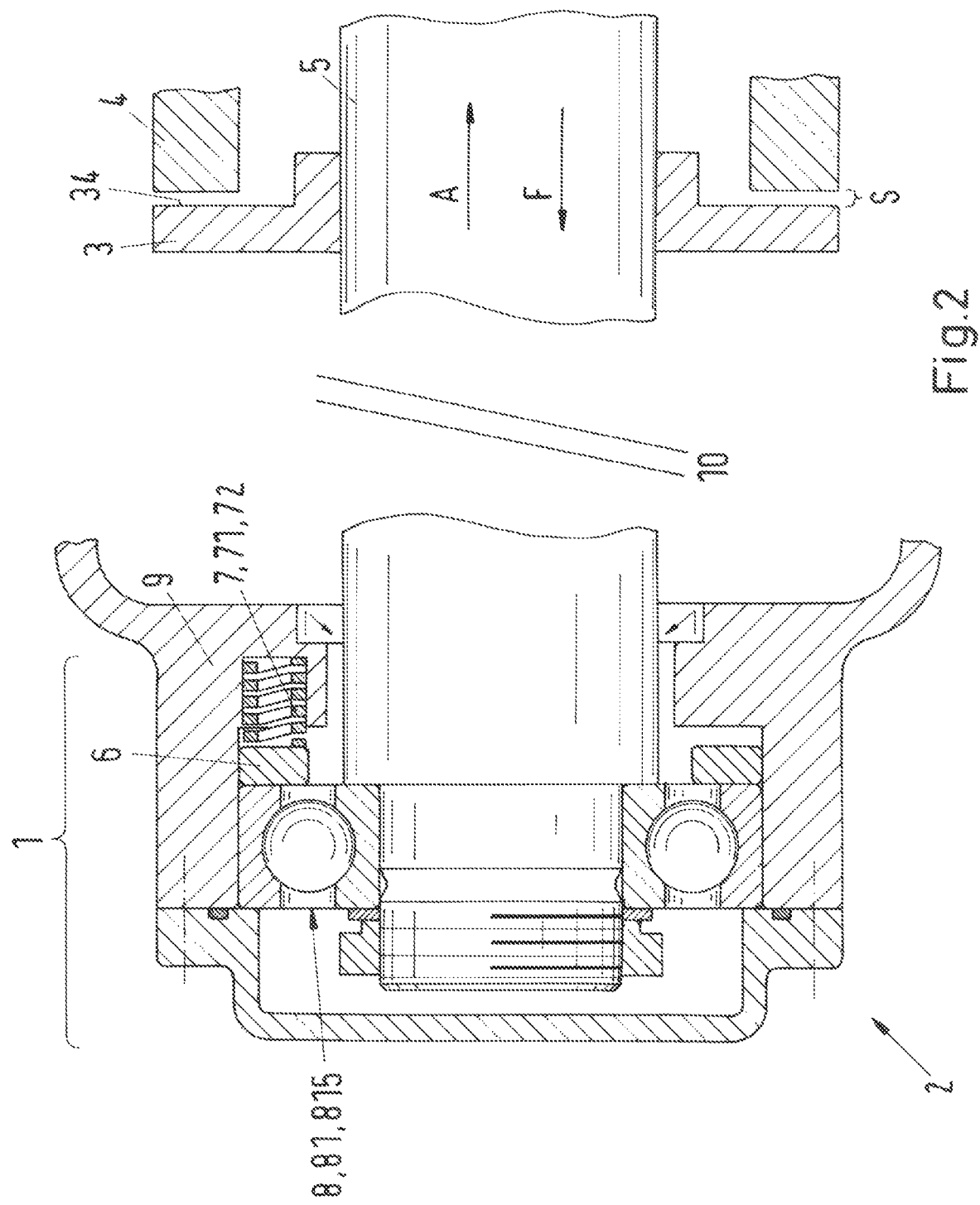
FIG. 2 is a first embodiment of the shaft bearing device according to the invention.

FIG. 2 shows a schematic illustration of a first embodiment of the shaft bearing device 1 according to the invention. The shaft bearing device 1 comprises an antifriction bearing 8, 81, 815, a pressure ring 6 and a spring 7, 71, 72. The antifriction bearing 8, 81, 815 is designed as a grooved ball bearing 815. The spring 7, 71, 72 is arranged between the housing 9 and the pressure ring 6 in such a way, that a spring force F acts on the grooved ball bearing 815 via the pressure ring 6, that the contact surfaces 34 of the lifting element 3 and of the counter element 4 are separated and a gap S is present. In the operating state, the spring force F counteracts the axial thrust A caused by the rotation of the impellers. The axis interruption 10 shows that the shaft bearing device 1 with the integrated lifting device may be arranged at the pump shaft 5 at any distance from the lifting element 3 and the counter element 4. In particular, the spring 7, 71, 72 is arranged at the grooved ball bearing 815 in such a way, that the spring force F acts parallel to the axis of the pump shaft. Thus, the spring 7, 71, 72 is arranged at the grooved ball bearing 815 in such a way that a spring force F acts on the outer ring of the grooved ball bearing 815, so that an axial thrust A of the pump shaft 5 can be compensated in a shutdown state and/or in a starting state. A lifting element 3 attached to the pump shaft 5 and a corresponding counter element 4 are separated from each other in a starting state and/or in a shutdown state by the spring force F of the spring 7, 71,72. After the starting state, when the self-lubrication of the pump 2 has started, a lubricant film forms between the lifting element 3 and the counter element 4, so that the lifting element 3 and the counter element 4 can run on each other substantially without wear by means of a lubricating film of a lubricating fluid located between them.

Figure 3:
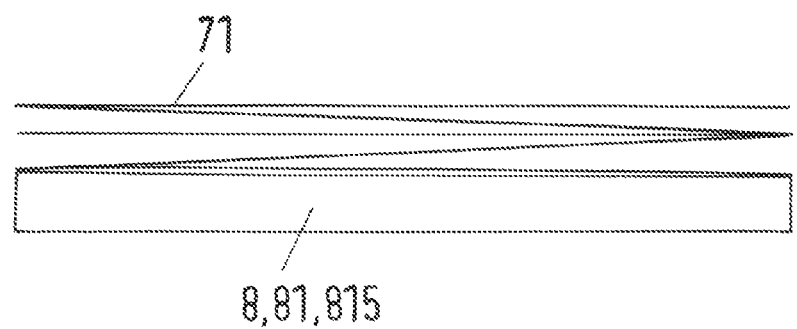
FIG. 3 is a section of another embodiment of the shaft bearing device according to the invention in different perspectives.

FIG. 3 shows a section of another embodiment of the shaft bearing device 1 according to the invention in different perspectives. The spring 7, 71, 72 is designed as a spiral spring 71 that wraps around the pump shaft 5. The spring force F acts directly on the outer ring 812 of the shaft bearing device 1, whereby the lifting element 3 and the counter element 4 are separated from each other. The spiral spring 71 is arranged between the housing 9 and the antifriction bearing 8, 81, 815. In particular, the spiral spring 71 is arranged at the antifriction bearing 8, 81, 815 in such a way that the spring force F acts parallel to the axis of the pump shaft 5. Thus, the spiral spring 71 is arranged at the antifriction bearing 8, 81, 815 in such a way that a spring force F acts on the outer ring of the antifriction bearing 8, 81, 815, so that an axial thrust A of the pump shaft 5 can be compensated in a shutdown state and/or in a starting state. A lifting element 3 attached to the pump shaft 5 and a corresponding counter element 4 are separated from each other in a starting state and/or a shutdown state by the spring force F of the spiral spring 71.

Figure 4:
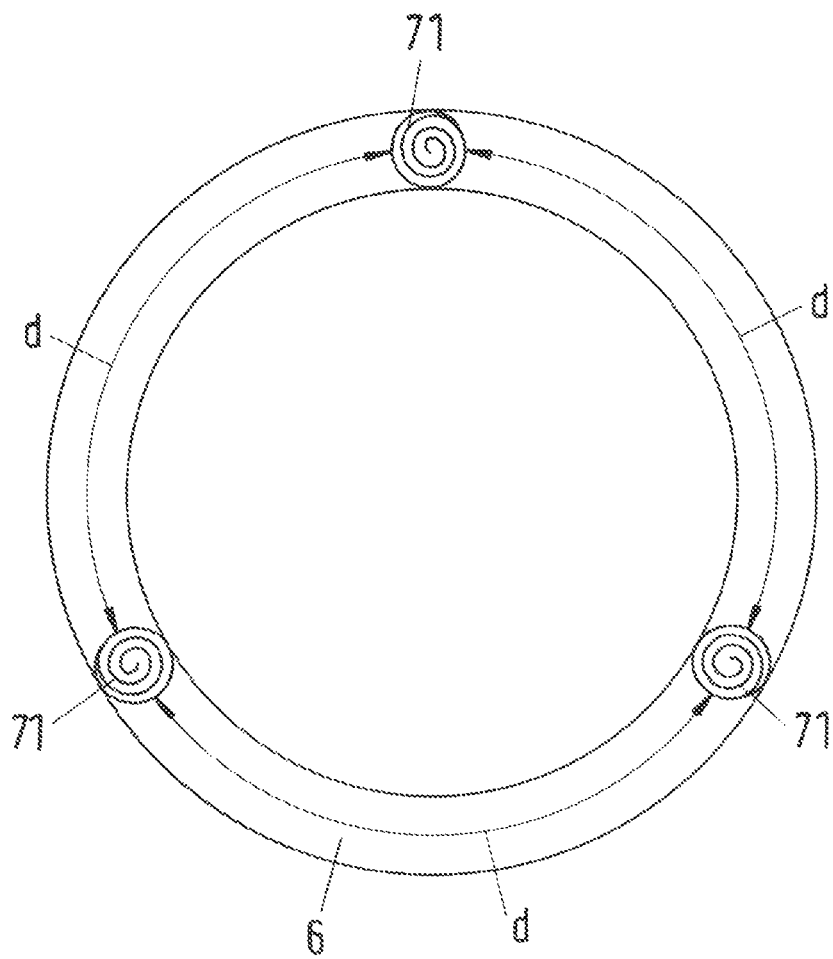
FIG. 4 is a section of another embodiment of the shaft bearing device according to the invention.

FIG. 4 shows a section of another embodiment of the shaft bearing device 1 according to the invention. The springs 7, 71, 72 are designed as single spiral springs 71 and the spring force F acts on the antifriction bearing 8, 81, 815 of the shaft bearing device 1 and thus on the pump shaft 5 via the pressure ring 6. The spiral springs 71 are distributed over the circumference of the pressure ring 6 at the same distance d. The spiral springs 71 may be arranged between the housing 9 and the antifriction bearing 8, 81, 815 and/or the pressure ring 6. In particular, the spiral springs 71 are arranged at the pressure ring 6 in such a way, that the spring force F acts parallel to the axis of the pump shaft 5. Thus, the spiral springs 71 are arranged at the pressure ring 6 in such a way that a spring force F acts on the pressure ring 6, so that an axial thrust A of the pump shaft 5 can be compensated in a shutdown state and/or in a starting state. A lifting element 3 attached to the pump shaft 5 and a corresponding counter element 4 are separated from each other in a starting state and/or in a shutdown state by the spring force F of the spiral springs 71.

Figure 5:
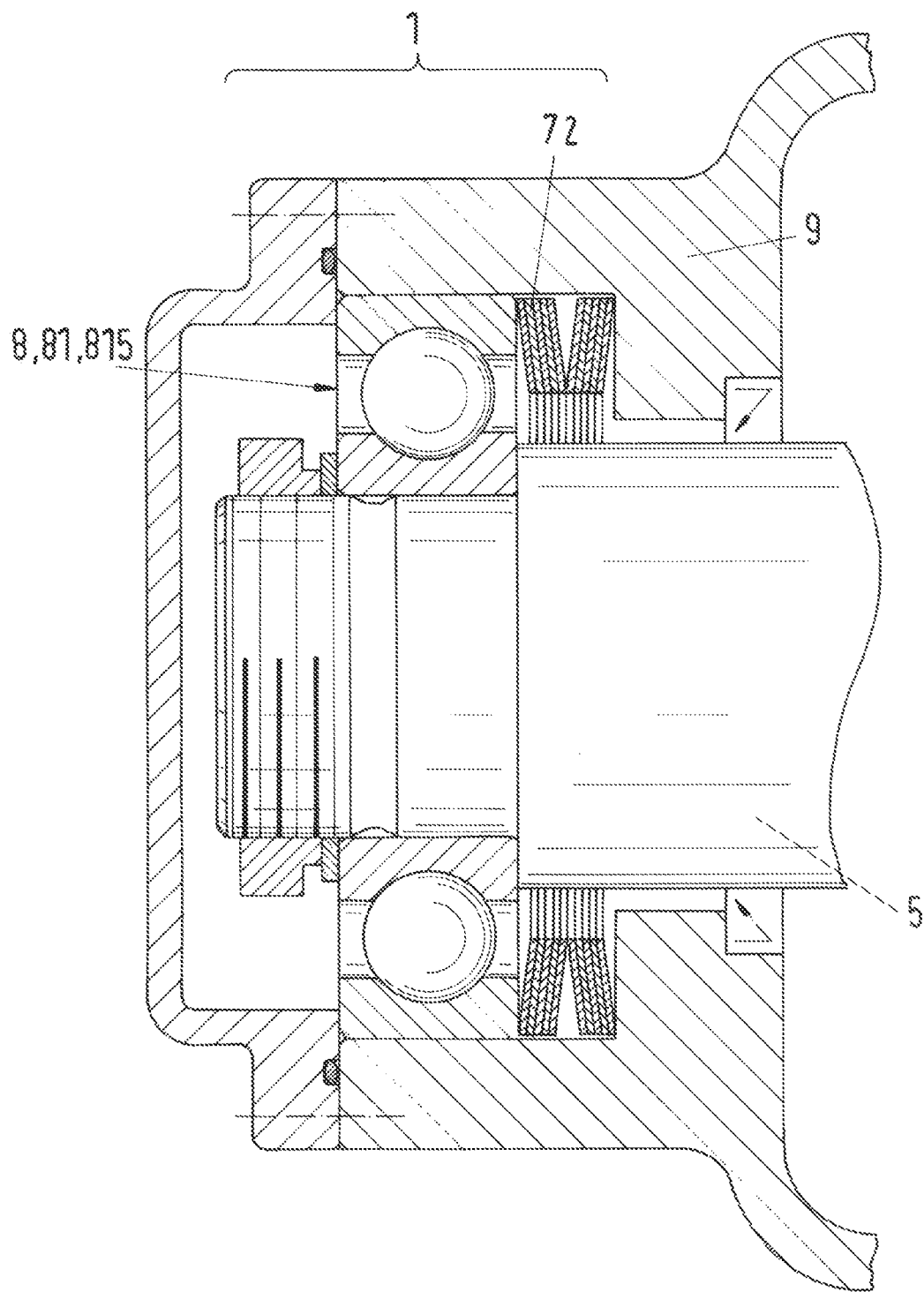
FIG. 5 is another embodiment of the shaft bearing device according to the invention.

FIG. 5 shows another embodiment of the shaft bearing device 1 according to the invention. The springs 7, 71, 72 are designed as disk springs and the spring force F acts on the antifriction bearing 8, 81, 815 of the shaft bearing device 1 and thus on the pump shaft 5. The disk springs 72 are arranged in opposite directions by way of example as two pairs, each with five disk springs 72. The person skilled in the art understands, that other arrangements with more or less disk springs 72 and as different arrangement types are also possible. The disk springs 72 are arranged between the housing 9 and the antifriction bearing 8, 81, 815. In particular, the disk springs 72 are arranged at the antifriction bearing 8, 81, 815 in such a way that the spring force F acts parallel to the axis of the pump shaft 5. Thus, the disk springs 72 are arranged at the antifriction bearing 8, 81 in such a way that a spring force F acts, so that an axial thrust A of the pump shaft 5 can be compensated in a shutdown state and/or in a starting state. A lifting element 3 attached to the pump shaft 5 and a corresponding counter element 4 are separated from each other in a starting state and/or in a shutdown state by the spring force F of the disk springs 72.

FIG. 6 shows a schematic illustration of a longitudinal section of the shaft bearing device 1 according to the invention in different operating states Z1, Z2. The shaft bearing device 1 has the same design as described in FIG. 1. According to the illustration, the pump 2 is in an operating state Z1 on the lower side of the figure. The operating state Z1 describes an operating state in which the axial thrust A is greater than the spring force F. On the upper side of the illustration, the pump 2 is in an operating state Z2, which corresponds to the starting and/or shutdown state and/or the mounting condition and in which the axial thrust A is smaller than the spring force F. In the operating state Z2, when the axial thrust A is not yet sufficient to overcome the spring force F, the lifting element 3 and the counter element 4 are separated by a gap S in such a way, that a lubricant film can form between the two contact surfaces 34 and the two components do not wear out after the starting state and/or during the shutdown state. Moreover, in the operating state Z2, a first surface on the outer ring 812 on a first side of the antifriction bearing 8, 81, 812 transverse to an axis of the pump shaft 5 at a first end of the antifriction bearing 8, 81, 812 abuts a surface of the bearing housing 9 when the pump is in a shutdown state and a second surface on the inner ring 813 on a second side, opposite the first side, of the antifriction bearing transverse to the axis of the pump shaft at a second end of the antifriction bearing 8, 81, 812 abuts a surface of the pump shaft 5. If the axial thrust A caused by the rotation of the impellers is greater than the spring force F, the pump shaft 5 is displaced and thus the lifting element 3 in such a way, that the gap S is reduced. The spring 7, 71, 72 is compressed by displacing the pump shaft 5. The lifting element 3 and the counter element 4 can slide on top of each other by reducing the width of the gap S and can act as a relief device for the axial thrust A of the impellers.

The invention claimed is:

1. A pump, comprising:
   an axially displaceable pump shaft;
   a shaft bearing device, the shaft bearing device including an antifriction bearing configured to be connected to the axially displaceable pump shaft, and being a radial bearing in contact with a bearing housing and configured to absorb radial forces of the pump shaft, the antifriction bearing comprising an inner ring and an outer ring, a first surface on the outer ring on a first side of the antifriction bearing transverse to an axis of the pump shaft at a first end of the antifriction bearing abuts a surface of the bearing housing when the pump is in a shutdown state and a second surface on the inner ring on a second side, opposite the first side, of the antifriction bearing transverse to the axis of the pump shaft at a second end of the antifriction bearing abuts a surface of the shaft; and
   a spring arranged at the antifriction bearing such that a spring force is capable of being transmitted to the antifriction bearing by the spring in a mounting condition of the shaft bearing device such that a lifting element attached to the pump shaft and a corresponding counter element are separated from each other in at least one of a starting state and a shutdown state of the pump; and
   a pressure ring supporting the spring at the bearing housing of the antifriction bearing, the pressure ring being disposed between the spring and the antifriction bearing such that the spring force is capable of acting on the antifriction bearing via the pressure ring.

2. The pump according to claim 1, wherein the spring is one of at least three springs arranged over a circumference of at least one of the antifriction bearing and the pressure ring.

3. The pump according to claim 1, wherein the spring is a disk spring configured to be arranged around the pump shaft.

4. The pump according to claim 1, wherein the antifriction bearing is a ball or cylindrical roller bearing.

5. The pump according to claim 1, wherein the antifriction bearing is a grooved ball bearing or an angular ball bearing.

6. The pump according to claim 1, wherein a contact surface of at least one of the lifting element and the corresponding counter element is coated.

7. The pump according to claim 6, wherein the contact surface is coated with a solid lubricant.

8. The pump to claim 1, wherein at least one of the lifting element, the counter element, the pressure ring and the antifriction bearing comprises a fiber-reinforced compound material or a thermoplastic synthetic material.

9. The pump according to claim 1, wherein the spring is one of at least three springs arranged at a same distance over a circumference of at least one of the antifriction bearing and the pressure ring.

10. The pump according to claim 1, wherein a contact surface of at least one of the lifting element and the corresponding counter element is ceramic coated.

11. The pump according to claim 1, wherein at least one of the lifting element, the counter element, the pressure ring and the antifriction bearing comprises a polyether ketone.

12. The pump according to claim 1, wherein the first surface of the antifriction at the first end of the antifriction bearing is separated from the surface of the bearing housing when the pump is in an operating state, enabling the lifting element and the corresponding counter element to slide on top of each other by reducing a width of a gap formed therebetween.

13. A shaft bearing device for a pump, the shaft bearing device comprising:
   an antifriction bearing that is a radial bearing in contact with a bearing housing and configured to absorb radial forces of a shaft, the antifriction bearing comprising an inner ring and an outer ring; and
   a spring arranged at the antifriction bearing such that a spring force is capable of being transmitted to the antifriction bearing by the spring in a mounting condition of the shaft bearing device such that a lifting element and a corresponding counter element are separated from each other in at least one of a starting state and a shutdown state of the pump, a first surface on the outer ring on a first side of the antifriction bearing transverse to an axis of the shaft at a first end of the antifriction bearing abuts a surface of the bearing housing when the pump is in a shutdown state and a second surface on the inner ring on a second side, opposite the first side, of the antifriction bearing transverse to the axis of the shaft at a second end of the antifriction bearing abuts a surface of the pump shaft; and
   a pressure ring supporting the spring at the bearing housing of the antifriction bearing, the pressure ring being disposed between the spring and the antifriction bearing such that the spring force is capable of acting on the antifriction bearing via the pressure ring.

14. The shaft bearing device according to claim 13, wherein the first surface of the antifriction at the first end of the antifriction bearing is separated from the surface of the bearing housing when the pump is in an operating state, enabling the lifting element and the corresponding counter element to slide on top of each other by reducing a width of a gap formed therebetween.

* * * * *